Oct. 8, 1957  P. C. VAN DER WILLIGEN ET AL  2,809,280
AUTOMATIC WELDING DEVICE
Filed Dec. 30, 1954
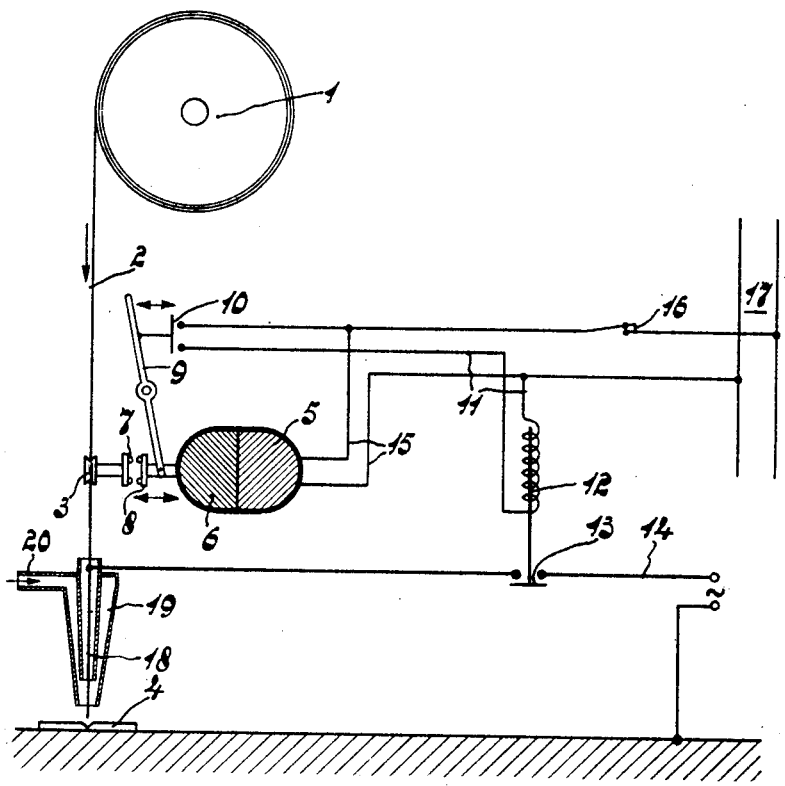
INVENTORS
PAUL CHRISTIAAN VAN DER WILLIGEN
NICOLAAS SJOERD THEODORUS FELDBERG
GERARDUS OTTEN
BY
AGENT United States Patent Office 2,809,280
Patented Oct. 8, 1957

2,809,280

AUTOMATIC WELDING DEVICE

Paul Christiaan van der Willigen, Nicolaas Sjoerd Theodorus Feldberg and Gerardus Otten, Emmasingel, Eindhoven, Netherlands, assignors, by mesne assignments, to North American Philips Company, Inc., New York, N. Y., a corporation of Delaware Application December 30, 1954, Serial No. 478,706

Claims priority, application Netherlands January 22, 1954

6 Claims. (Cl. 219—130)

The invention relates to a device and a method for automatic welding in a protective gaseous atmosphere, in which a welding wire is conveyed by a motor to a work piece to be welded.

It is known that the welding operation carried out in a protective gaseous atmosphere provides self-controlling properties, so that small fluctuations in the velocity of the welding-wire supply and fluctuations in the line voltage are automatically compensated.

In order to obtain a most effective welding operation, it is, however, of importance to keep the supply of welding wire as constant as possible. Then the current intensity can be adjusted in a manner such that the most suitable arc length is obtained. In this manner, a cheap and easily controllable automatic welding device is obtained, which permits effective welding.

For a very constant supply of welding wire it is advisable to use a comparatively heavy driving motor, which may, if desired, be provided with a flywheel. The driving by means of a high inertia mass has a limitation in that when starting the automatic device the correct velocity of the supply of welding wire is not immediately attained.

The invention has for its object to obviate this disadvantage.

According to the invention, the device driving the welding wire includes a disengagable clutch. In this manner, the motor for the conveyance of the welding wire may be caused to attain its speed of rotation while the clutch is disengaged, after which the clutch may be engaged. The entire weld may thus be obtained with the most suitable velocity of the supply of welding wire, so that a very regular welding seam is obtained. This is of particular importance for automatic welding, since in this case the velocity of manufacture of the welding seam remains constant, after it has once been adjusted. Then there is no objection to the use of a heavy driving motor for the supply of welding wire and to the provision of a flywheel.

It should be noted that it is known to use a clutch in the driving of the welding wire for automatic welding not carried out in a protective gaseous atmosphere. This clutch is then constituted by a slip clutch, which is governed by the arc voltage. If the arc voltage increases, the clutch is adjusted to a smaller amount of slip, so that the supply of wire increases. If the arc voltage decreases, the clutch is adjusted to a higher amount of slip. However, with automatic welding in a protective gaseous atmosphere, such a clutch may be dispensed with due to the self-regulating properties of this welding method.

In order that the invention may be readily carried into effect, it will now be described more fully with reference to the accompanying drawing, wherein the single figure is a schematic diagram of an embodiment of the device according to the invention.

A welding wire 2, wound on a reel 1, is conveyed by means of rollers 3, of which the figure shows only one, to a work piece 4 to be welded. One of the rollers 3 is driven by an electric motor 5 by way of speed regulating means 6 and a disengageable clutch 7. A movable part 8 of the clutch 7 is connected through a lever 9 with a switch 10. The terminals closed by the switch 10 are in a circuit 11, which includes a relay 12 for controlling a switch 13 in a welding-current circuit 14. The motor circuit 15 and the circuit 11 can be connected to current supply lines 17 by way of a switch 16. The end 18 of the welding wire 2 is surrounded by a mouth piece 19, to which the protective gas is supplied through a duct 20.

Instead of the claw clutch 7, one of the rollers 3 may, as an alternative, be arranged to be movable and be connected with a lever 9 in a manner such that the closure of the switch 10 automatically produces the clamping of the welding wire 2 between the rollers 3.

The welding operation is as follows.

In the starting position, the end 18 of the welding wire 2 bears on the work piece 4. By means of the switch 16 the current supply for the motor 5 is switched on, while the clutch 7 is disengaged and the switch 10 is open, as is shown in the figure. When the switch 16 is closed, a relay (not shown) included in the circuit 15 may be energized to open a valve in the gas supply duct 20. When the motor 5 has attained its speed of rotation, the lever 9 is changed over, so that the rollers 3 are actuated. At the same time the switch 10 is closed, the relay 12 is energized and the switch 13 closes the welding circuit 14. The end 18 of the welding wire is then moved up against the working piece 4, and due to the very great development of heat in the short-circuited welding wire, the wire melts and the arc is struck.

What is claimed is:

1. A device for automatic welding in a protective gaseous atmosphere comprising a motor, means operatively connected to said motor for conveying welding wire to a work piece including at elast one disengageable clutch, a switch operatively connected to said clutch, a circuit for welding current whereby upon engagement of said clutch said circuit is completed thereby supplying current to said welding wire.

2. A device as set forth in claim 1 wherein said motor circuit is connected in parallel with said circuit for welding current, the latter circuit including a relay and a relay-operated switch whereby upon closing said switch operatively connected to said clutch said relay is energized and the relay-operated switch closed to thereby complete the circuit for welding current.

3. A device as set forth in claim 2 wherein said switch operatively connected to said clutch functions at the same time that said clutch is engaged to complete the relay circuit connected in parallel with the motor circuit.

4. A device for automatic welding in a protective gaseous atmosphere, comprising means for conveying a welding wire to a workpiece to be welded including a motor and a clutch, said wire being operatively driven by said motor through said clutch, means for engaging said clutch when said motor attains a normal operating speed, and means for supplying welding current to said wire substantially simultaneously with the engagement of said clutch.

5. A device for automatic welding in a protective gaseous atmosphere, comprising means for conveying a welding wire to a workpiece to be welded including a motor and a clutch, said wire being operatively driven by said motor through said clutch, means for engaging said clutch when said motor attains the normal operating speed, and means for supplying welding current to said wire substantially simultaneously with the engagement of said clutch, said last-mentioned means comprising a welding current supply circuit, a relay, a switch in said welding current supply circuit adapted to close in response to energization of said relay, a relay energization current supply circuit, and a switch in said relay energization current supply circuit adapted to be closed upon engagement of said clutch.

6. A device for automatic welding in a protective gaseous atmosphere, comprising means for conveying a welding wire to a workpiece to be welded including a motor and a clutch, said wire being operatively driven by said motor through said clutch, a switching arm for disengaging said clutch until said motor attains a normal operation speed and for engaging said clutch when said motor attains normal operating speed, a welding current supply circuit, a relay, first switching means in said welding current supply circuit adapted to close in response to energization of said relay, a relay energization current supply circuit, second switching means in said relay energization current supply circuit, and means actuated by said switching arm for closing said second switching means when the said switching arm is in the position wherein said clutch is engaged.

References Cited in the file of this patent

UNITED STATES PATENTS

| | | |
|---|---|---|
| 1,287,774 | Sessions | Dec. 17, 1918 |
| 1,701,372 | Jefts | Feb. 5, 1929 |
| 2,020,278 | Larson | Nov. 5, 1935 |